(12) United States Patent
Huang et al.

(10) Patent No.: US 7,551,099 B2
(45) Date of Patent: Jun. 23, 2009

(54) FOLDABLE ELECTRONIC ALARM DEVICE AND ALARM DISPLAY DEVICE

(75) Inventors: Chia-Huang Huang, Taipei (TW); Chih-Sheng Tsai, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 276 days.

(21) Appl. No.: 11/464,830

(22) Filed: Aug. 16, 2006

(65) Prior Publication Data
US 2007/0075871 A1    Apr. 5, 2007

(30) Foreign Application Priority Data
Aug. 17, 2005   (TW) .............................. 94127992 A

(51) Int. Cl.
*G08B 21/00* (2006.01)
(52) U.S. Cl. ....................... 340/665; 340/540
(58) Field of Classification Search .................. 340/665
See application file for complete search history.

(56) References Cited

U.S. PATENT DOCUMENTS

| | | | | |
|---|---|---|---|---|
| 4,003,245 A | * | 1/1977 | Ogata et al. ................... | 73/800 |
| 5,078,153 A | * | 1/1992 | Nordlander et al. ......... | 600/590 |
| 7,079,035 B2 | * | 7/2006 | Bock et al. ................ | 340/573.1 |
| 2005/0190058 A1 | * | 9/2005 | Call ....................... | 340/539.26 |
| 2006/0287972 A1 | * | 12/2006 | Kelso et al. .................... | 707/1 |

FOREIGN PATENT DOCUMENTS

| | | |
|---|---|---|
| CN | 2544334 | 4/2003 |
| CN | 1442673 | 9/2003 |
| CN | 1607380 | 4/2005 |
| JP | 10-319852 | 12/1998 |
| JP | 10319852 A * | 12/1998 |

* cited by examiner

*Primary Examiner*—Toan N Pham
*Assistant Examiner*—Kerri L McNally
(74) *Attorney, Agent, or Firm*—Jianq Chyun IP Office

(57) ABSTRACT

A foldable electronic alarm device including a first housing, a second housing, a pivot, a display screen and an alarm module is provided, wherein the pivot is disposed in one side of the first housing and the second housing to enable the first housing to pivot relative to the second housing. The display screen is disposed inside the first housing. Moreover, the alarm module is disposed between the display screen and the first housing. When the alarm module is pressed by the first housing or the display screen, an alarm is sent out by the alarm module.

12 Claims, 3 Drawing Sheets

FOLDABLE ELECTRONIC ALARM DEVICE AND ALARM DISPLAY DEVICE

CROSS-REFERENCE TO RELATED APPLICATION

This application claims the priority benefit of Taiwan application serial no. 94127992, filed on Aug. 17, 2005. All disclosure of the Taiwan application is incorporated herein by reference.

BACKGROUND OF THE INVENTION

1. Field of the Invention

The present invention relates to a foldable electronic device and a display device and more particularly relates to a foldable electronic device and a display device which are capable of sending out an alarm.

2. Description of the Related Art

In general, some electronic devices such as notebook computers and mobile phones are made foldable by the manufactures for portability. Such foldable electronic devices are usually divided into two different parts that are connected with each other via a pivot, wherein one part comprises a display screen and the other is the host with an operation interface.

Since the aforesaid foldable electronic devices have advantages such as light weight, compact size and lesser space requirements, it is convenient for the user to carry them around. However, the foldable electronic devices are easily jarred or pressed when transported, which often causes devices to malfunction, especially the display screen which usually has the highest malfunction rate.

Purchasers of the aforesaid foldable electronic devices are usually provided with a limited time warranty. However, malfunctions caused by improper usage such as usage resulting in shocks and pressure are not covered by the warranty. Since the true cause of a malfunction is not easily determined, disputes between the purchasers and sales personnel tend to occur.

SUMMARY OF THE INVENTION

Accordingly, at least one object of the present invention is to provide a foldable electronic device or display device capable of sending out an alarm to warn the user when it is hit or pressed.

At least another object of the present invention is to provide a foldable electronic device or display device which are capable of warning the user when pressure caused by jarring or squeezing affects pressure sensitive paper with pressure higher than the maximum pressure that can be sustained by the display screen, where upon the color of the pressure sensitive paper changes.

To achieve these and other advantages and in accordance with the purpose of the invention, as embodied and broadly described herein, the present invention provides a foldable electronic alarm device comprising a first housing, a second housing, a pivot, a display screen and an alarm module. The pivot is disposed on one side of the first housing and the second housing to enable the first housing to pivot relative to the second housing. The display screen is disposed inside the first housing. Moreover, the alarm module is disposed between the display screen and the first housing. When the alarm module is pressed by the first housing or the display screen, an alarm is sent out by the alarm module.

In the aforesaid foldable electronic alarm device, the alarm module comprises a circuit board, a pressure sensor, and a speaker, wherein the circuit board has a chip. The pressure sensor electrically coupled to the circuit board detects pressure applied thereon by the first housing or the display screen and then sends a signal back to the chip. The speaker is disposed on the circuit board, and the chip controls the speaker to send out an alarm according to the signal from the pressure sensor.

The present invention further provides an alarm display device comprising a housing, a display screen, and an alarm module, wherein the display screen is disposed inside the housing and the alarm module is disposed between the display screen and the housing. When the alarm module is pressed by the housing or the display screen, the alarm module sends out an alarm.

In the alarm display device mentioned above, the alarm module comprises a circuit board, a pressure sensor, and a speaker, wherein the circuit board has a chip, and the pressure sensor electrically coupled to the circuit board detects a pressure applied thereon by the housing or the display screen and sends a signal back to the chip. The speaker is disposed on the circuit board, and the chip controls the speaker to send out an alarm according to the signal from the pressure sensor.

In the present invention, since an alarm module is disposed in the foldable electronic device/display device, when the foldable electronic device/display device is struck or unduly pressed, an alarm is sent out by the alarm module to warn the user to reduce the pressure, thus reducing the possibility of the malfunction of the foldable electronic device/display device due to the external force.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

The embodiment of the present invention mainly disposes an alarm module between the display screen and the housing of an electronic device so that an alarm will be sent out when the electronic device is hit or pressed. The embodiment of the present invention can be applied to any electronic device having a display screen, such as a display device or a foldable electronic device.

Figure 1:
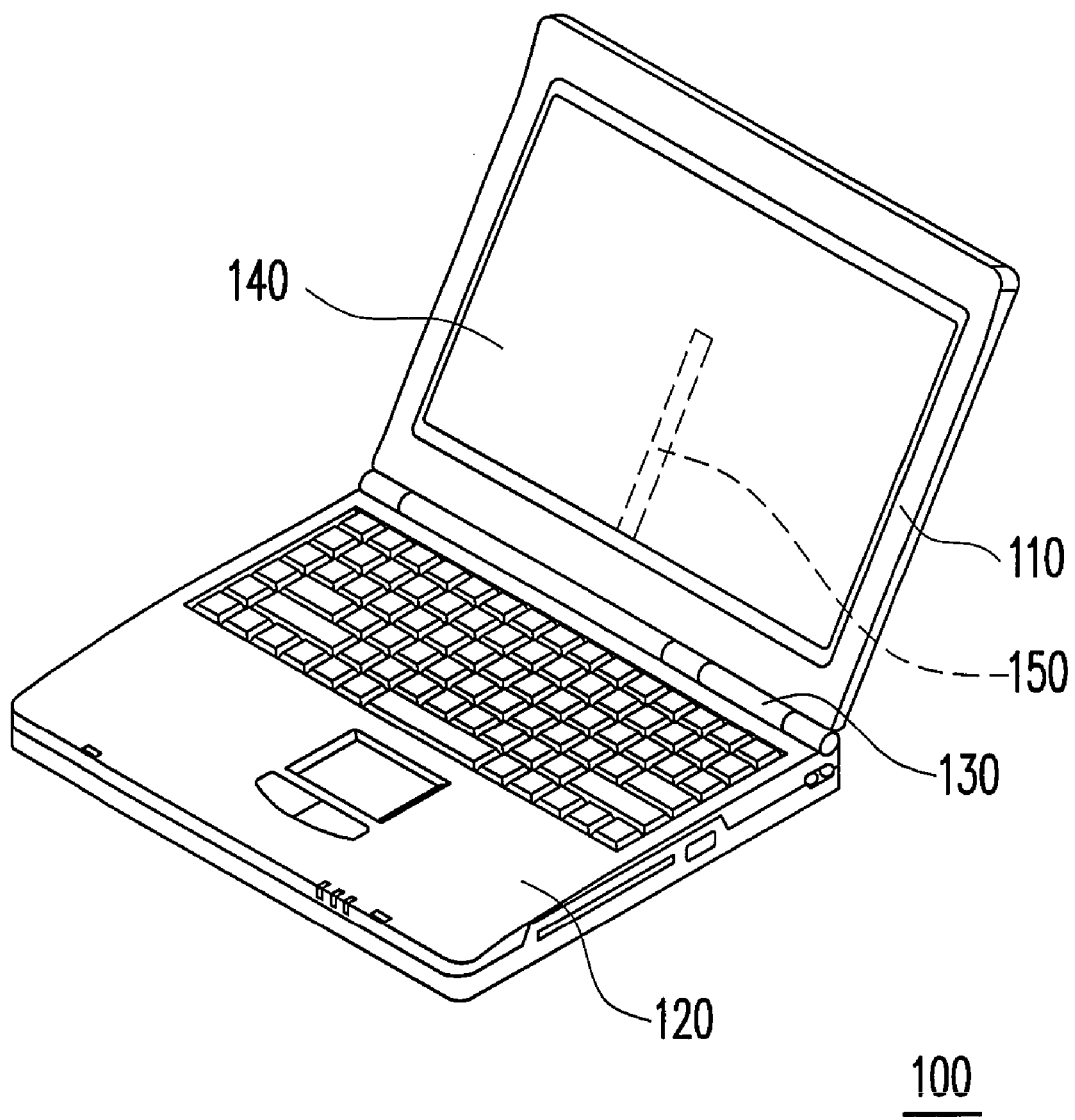
FIG. 1 is a schematic view of a foldable electronic alarm device according to an embodiment of the present invention.
Figure 2:
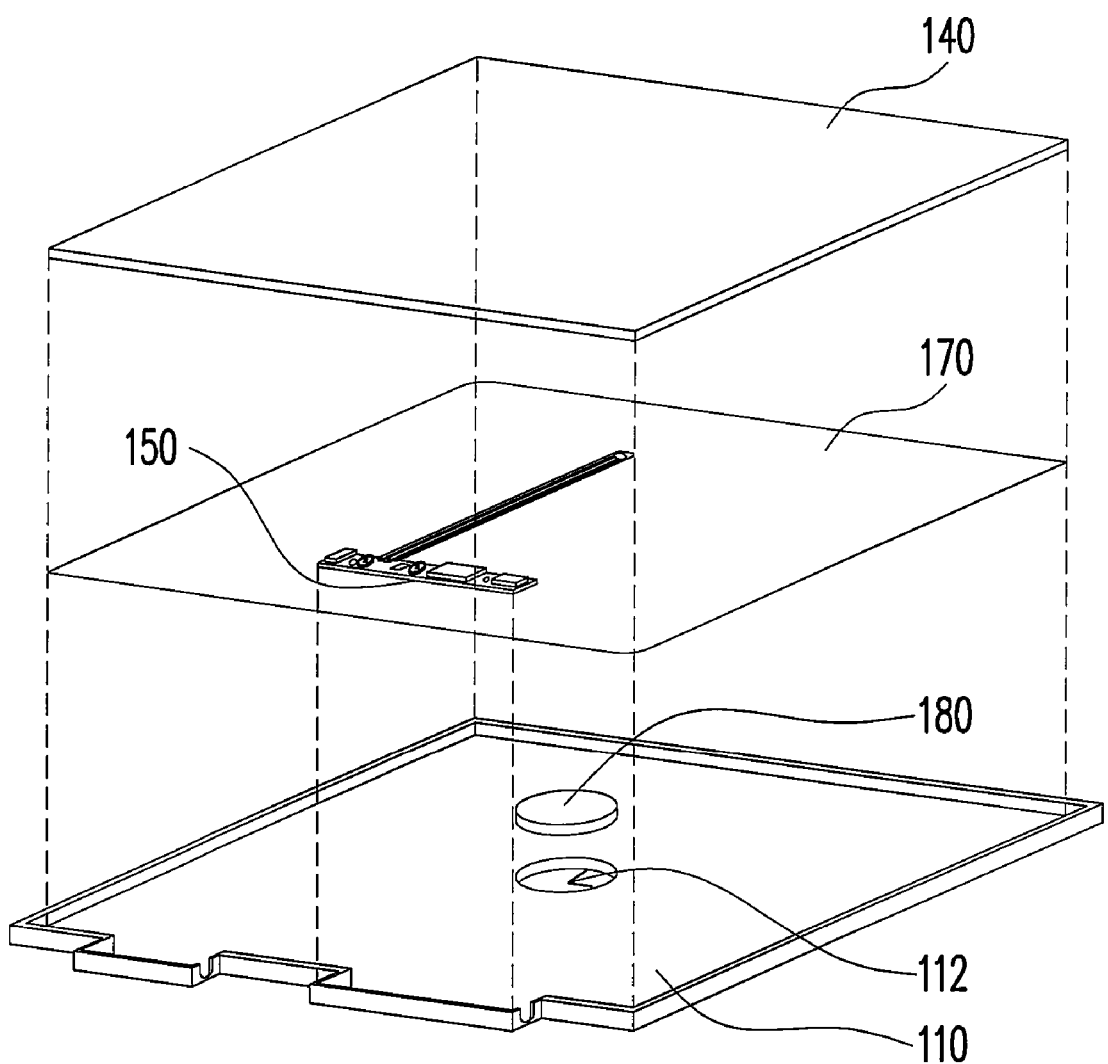
FIG. 2 is a partial decomposition diagram of a foldable electronic alarm device.
Figure 3:
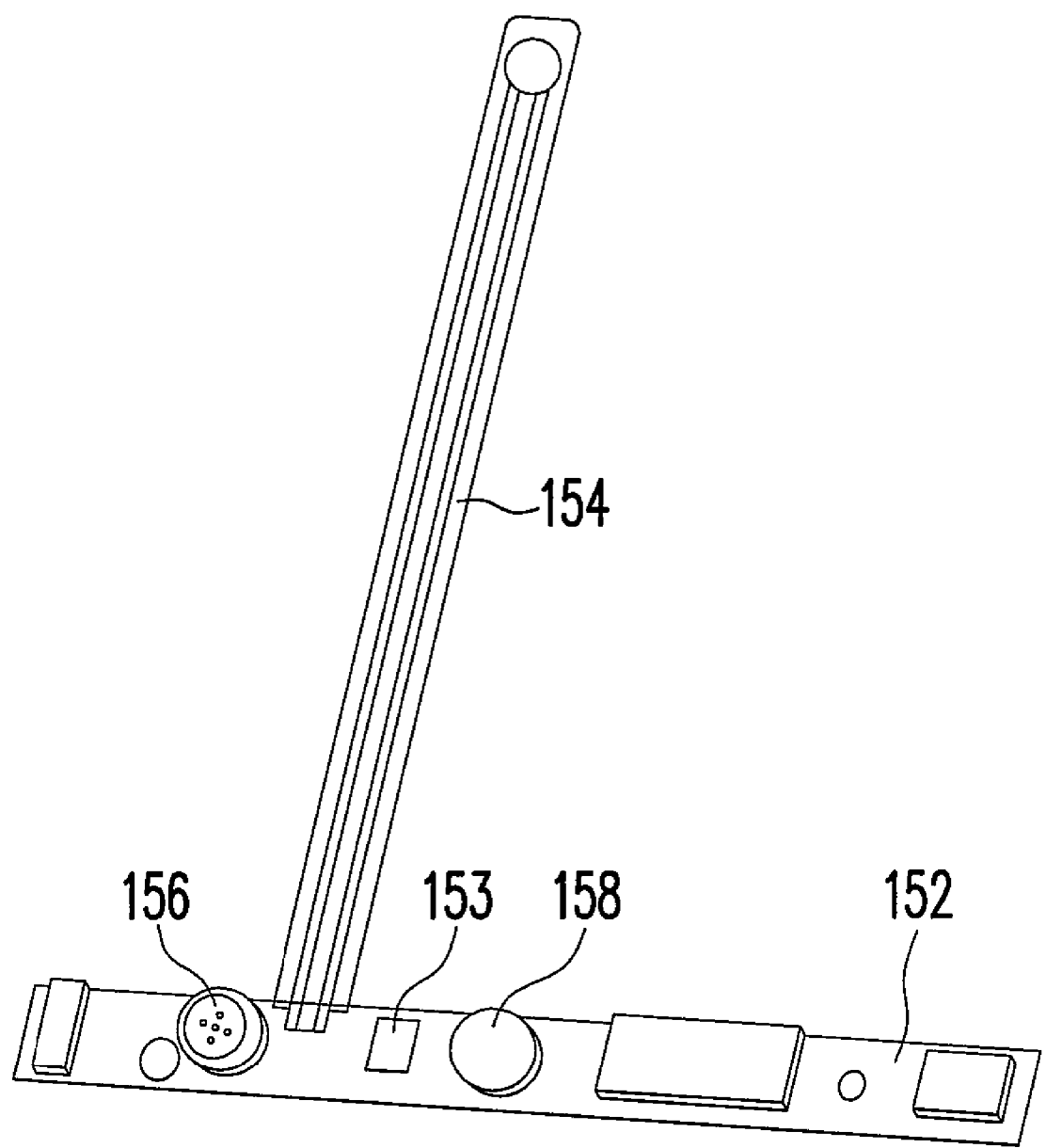
FIG. 3 is a schematic view illustrating the structure of an alarm module.

FIG. 1 is a schematic view of a foldable electronic alarm device according to one embodiment of the present invention; FIG. 2 is a partial decomposition diagram of a foldable electronic alarm device; and FIG. 3 is a schematic view illustrating the structure of an alarm module. In FIG. 1~3, the foldable electronic alarm device 100 of the present embodiment is a notebook computer. The foldable electronic alarm device 100 comprises a first housing 110, a second housing 120, a pivot 130, a display screen 140, and an alarm module 150, wherein the pivot 130 is disposed in one side of the first housing 110 and the second housing 120 to enable the first housing 110 to pivot relative to the second housing 120. The display screen 140 is disposed inside the first housing 110. Moreover, the alarm module 150 is disposed between the display screen 140 and the first housing 110. When the alarm module 150 is pressed by the first housing 110 or the display screen 140, an alarm is sent out by the alarm module 150.

In addition, the display screen 140 is a liquid crystal display (LCD) or other flat display screen, for example. In FIG. 3, the alarm module 150 comprises a circuit board 152, a pressure sensor 154, and a speaker 156, for example, wherein the circuit board 152 has a chip 153, the pressure sensor 154 electrically couples to the circuit board 152, and the speaker 156 is disposed on the circuit board 152. The pressure sensor 154 detects a pressure applied thereon. The speaker 156 can be a buzzer or any electronic device that can send out a warning sound or a warning music.

When the pressure sensor 154 of the alarm module 150 is pressed by the first housing 110 or the display screen 140 due to external force, a signal is immediately sent by the pressure sensor 154 back to the chip 153. Meanwhile, the chip 153 directs the speaker 156 to send out an alarm to warn the user according to the signal from the pressure sensor 154, such that the user can remove the external force pressing onto the first housing 110 or the display screen 140 as soon as possible. Accordingly, the possibility of the external force breaking the display screen 140 is reduced.

In one embodiment of the present invention, the pressure sensor 154 sends a signal corresponding to a pressure value sent back to the chip 153 according to the value of the detected pressure, and the chip 153 directs the speaker 156 to send out an alarm with different amplitude and/or frequency according to the signal. In other words, the greater the pressure detected by the pressure sensor 154, the greater the amplitude and/or frequency of the alarm sent out by the speaker 156. It is more likely for the user to recognize the problem when the alarm appears louder and/or faster, so that the user can remove the pressure applied on the first housing 110 or the display screen 140 as soon as possible to prevent the display screen 140 from breaking by the external force.

In the present embodiment, when the pressure applied on the alarm module 150 is smaller than a maximum pressure that can be sustained by the display screen 140, the alarm module 150 stops the alarm immediately after the pressure applied on the alarm module 150 is removed. On the other hand, when the pressure applied on the alarm module 150 is greater than the maximum pressure that can be sustained by the display screen 140, the alarm module 150 continuously sends out an alarm even after the pressure applied on the alarm module 150 is removed, such that the user can be warned that the display screen may have been be damaged due to the greatness of the pressure.

It is to be noted that the pressure sensor 154 of the alarm module 150 mentioned above can be multiple and disposed at different locations of the display screen 140, such that the pressure is easier to be detected for warning the user by alarm in order to further reduce the possibility of breaking the display screen 140. In addition, the circuit board 152 of the alarm module 150 mentioned above can be integrated with the driving circuit board of the display screen 140 into a circuit board for saving space, thus not increasing the total size of the foldable electronic device 100. Using the liquid crystal display (LCD) as an example, the circuit board 152 of the alarm module 150 can be integrated with the backlighting driving circuit board of the LCD into a circuit board.

A main power supply is further comprised in the foldable electronic alarm device 100 of the present embodiment to provide the electric power required by the host and the display screen 140. In addition, the main power supply can provide the electric power required by the alarm module 150 when the alarm foldable electronic device 100 is powered on. Moreover, a battery 158 disposed on the circuit board 152 is further comprised in the alarm module 150. When the alarm foldable electronic device 100 is powered off, the battery 158 can provide the electric power required by the alarm module 150.

In one embodiment of the present invention, a pressure sensitive paper 170 is further comprised in the foldable electronic alarm device 100. The pressure sensitive paper 170 is disposed between the first housing 110 and the display screen 140. In the present embodiment, the pressure sensitive paper 170 is disposed between the first housing 110 and the alarm module 150 or disposed between the alarm module 150 and the display screen 140. The pressure sensitive paper 170 of FIG. 2 is disposed between the first housing 110 and the alarm module 150, wherein when the pressure applied on the pressure sensitive paper 170 by the first housing 110 or the display screen 140 is larger than the maximum pressure sustained by the display screen 140, the color of the pressure sensitive paper 170 changes.

Since the foldable electronic alarm device 100 comprises a pressure sensitive paper 170, when the display screen 140 of the foldable electronic alarm device 100 malfunctions and is delivered for repair service by the user, whether the damage to the display screen 140 has been caused by an external force can be easily determined based on the color of the pressure sensitive paper 170, such that the responsibility is clear and the arguments between the user and the sales personnel are effectively eliminated.

In one embodiment of the present invention, the first housing 110 can comprise an opening 112, and the foldable electronic alarm device 100 can further comprise a transparent sheet 180 that is embedded into the opening 112, such that the color of the pressure sensitive paper 170 can be easily viewed by the user and the sales personnel through the opening 112 and the responsibility of breaking the display screen 140 can be easily and clearly defined.

In summary, the foldable electronic alarm device and alarm display device of the present invention have at least the following advantages:

1. In the present invention, an alarm module is comprised in the foldable electronic device/display device, and when the foldable electronic device/display device is hit or pressed, an alarm is sent out by the alarm module to warn the user, such that the possibility of the malfunction of the foldable electronic device/display device caused by external force may be reduced.

2. In one embodiment of the present invention, a pressure sensitive paper is comprised in the foldable electronic device/display device for easily determining whether damage to the foldable electronic device/display device has been caused by external force, such that the responsibility of the damage are easily and clearly defined and arguments between the user and the sales personnel is effectively eliminated.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims and not by the above detailed description.

What is claimed is:

1. A foldable electronic alarm device, comprising:
a first housing having an opening;
a second housing;

a pivot disposed in one side of the first housing and the second housing to enable the first housing to pivot relative to the second housing;

a display screen disposed inside the first housing;

an alarm module disposed between the display screen and the first housing, wherein when the alarm module is pressed by the first housing or the display screen, an alarm is sent out by the alarm module;

a pressure sensitive paper disposed between the first housing and the display screen, wherein when the pressure applied on the pressure sensitive paper by the first housing or the display screen is larger than the maximum pressure that can be sustained by the display screen, a color of the pressure sensitive paper changes; and a transparent sheet embedded into the opening for easily viewing the color of the pressure sensitive paper.

2. The foldable electronic alarm device of claim 1, wherein an amplitude and/or a frequency of the alarm are positively proportional to the pressure applied on the alarm module.

3. The foldable electronic alarm device of claim 1, wherein when the pressure applied on the alarm module is smaller than a maximum pressure that can be sustained by the display screen, the alarm module stops the alarm immediately after the pressure applied on the alarm module is removed, but when the pressure applied on the alarm module is larger than the maximum pressure that can be sustained by the display screen, the alarm module continuously sends out the alarm even after the pressure applied on the alarm module is removed.

4. The foldable electronic alarm device of claim 1, wherein the alarm module comprises:

a circuit board having a chip;

a pressure sensor electrically coupled to the circuit board for detecting a pressure applied thereon by the first housing or the display screen and for sending a signal back to the chip; and a speaker disposed on the circuit board, wherein the chip controls the speaker to send out the alarm according to the signal from the pressure sensor.

5. The foldable electronic alarm device of claim 4 having a main power supply, wherein when the foldable electronic device is powered on, and the electric power required by the alarm module is provided by the main power supply; the alarm module further comprising a battery disposed on the circuit board, so that when the foldable electronic device is powered off, the electric power required by the alarm module is provided by the battery.

6. The foldable electronic alarm device of claim 1, wherein the pressure sensitive paper is disposed between the first housing and the alarm module.

7. An alarm display device, comprising:

a housing having an opening;

a display screen disposed inside the housing;

an alarm module disposed between the display screen and the housing, wherein when the alarm module is pressed by the housing or the display screen, an alarm is sent out by the alarm module;

a pressure sensitive paper disposed between the housing and the display screen, wherein when the pressure applied on the pressure sensitive paper by the housing or the display screen is larger than the maximum pressure that can be sustained by the display screen, a color of the pressure sensitive paper changes; and a transparent sheet embedded into the opening for easily viewing the color of the pressure sensitive paper.

8. The alarm display device of claim 7, wherein an amplitude and/or a frequency of the alarm are positively proportional to the pressure applied on the alarm module.

9. The alarm display device of claim 7, wherein when the pressure applied on the alarm module is smaller than a maximum pressure that can be sustained by the display screen, the alarm module stops the alarm immediately after the pressure applied on the alarm module is removed; but when the pressure applied on the alarm module is larger than the maximum pressure that can be sustained by the display screen, the alarm module continuously sends out the alarm even after the pressure applied on the alarm module is removed.

10. The alarm display device of claim 7, wherein the alarm module comprises:

a circuit board having a chip;

a pressure sensor electrically coupled to the circuit board for detecting a pressure applied thereon by the housing or the display screen and for sending a signal back to the chip; and a speaker disposed on the circuit board, wherein the chip controls the speaker to send out the alarm according to the signal from the pressure sensor.

11. The alarm display device of claim 10 having a main power supply, wherein when the display device is powered on, and the electric power required by the alarm module is provided by the main power supply; the alarm module further comprising a battery disposed on the circuit board, so that when the display device is powered off, the electric power required by the alarm module is provided by the battery.

12. The alarm display device of claim 7, wherein the pressure sensitive paper is disposed between the housing and the alarm module.

* * * * *